United States Patent
Otterness et al.

(10) Patent No.: US 6,792,505 B2
(45) Date of Patent: Sep. 14, 2004

(54) SYSTEM APPARATUS AND METHOD FOR STORAGE DEVICE CONTROLLER-BASED MESSAGE PASSING HAVING EFFECTIVE DATA CHANNEL BANDWIDTH AND CONTROLLER CACHE MEMORY INCREASE

(75) Inventors: Noel S. Otterness, Boulder, CO (US); Joseph G. Skazinski, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 09/836,806

(22) Filed: Apr. 16, 2001

(65) Prior Publication Data

US 2002/0152355 A1 Oct. 17, 2002

(51) Int. Cl.[7] .............................................. G06F 12/00
(52) U.S. Cl. ........................ 711/114; 711/148; 711/153; 710/38; 710/100; 710/308; 710/311; 710/316; 709/212; 709/216; 709/239
(58) Field of Search ........................... 711/114, 48, 153; 710/100, 308, 38, 311, 316; 709/212, 216, 239

(56) References Cited

U.S. PATENT DOCUMENTS

| | | | |
|---|---|---|---|
| 5,809,533 A | * | 9/1998 | Tran et al. ................... 711/141 |
| 6,230,240 B1 | * | 5/2001 | Shrader et al. ............. 711/114 |
| 6,425,049 B1 | * | 7/2002 | Yamamoto et al. ......... 711/112 |
| 6,606,683 B2 | * | 8/2003 | Mori ........................... 711/114 |

* cited by examiner

Primary Examiner—Donald Sparks
Assistant Examiner—Bao Q. Truong
(74) Attorney, Agent, or Firm—Dorsey & Whitney LLP

(57) ABSTRACT

Controller for coupling data between a data storage system and a host includes a first processor and a first RAM coupled to the first processor; a first auxiliary processor including a first memory controller and a first cache coupled to the first memory controller, the first memory controller including first interface for coupling with second auxiliary processor including second memory controller and associated second cache and second interface for coupling with first auxiliary processor, first memory controller including logic for treating the caches as single memory; a bus coupling first primary processor and first auxiliary processor; and interconnection channel separate from the bus coupling first interface of first memory controlled and second interface of second memory controller. Interconnection may be an out-of-band channel permitting device-to-device sharing of associated cache memories without requiring data transfer over the bus. Method and computer program product are also provided.

51 Claims, 8 Drawing Sheets

SYSTEM APPARATUS AND METHOD FOR STORAGE DEVICE CONTROLLER-BASED MESSAGE PASSING HAVING EFFECTIVE DATA CHANNEL BANDWIDTH AND CONTROLLER CACHE MEMORY INCREASE

FIELD OF THE INVENTION

This invention pertains generally to devices, device interconnection topologies, and methods for communicating data or other information between such devices; more particularly to inter- and intra-device connection and communication topologies and methods for such communication; and most particularly to RAID storage system controllers that increase available storage device interconnect channel capacity by routing controller-to-controller messages to a communication channel separate from the communication channel normally used to communicate the RAID data.

BACKGROUND

Standard interconnect schemes for sharing memory resources between controllers in respective data storage subsystems are known. Certain controller-to-controller message passing schemes and interconnect topologies are also known. These controllers typically use a message passing scheme to coordinate activities between the controllers. Such message passing schemes utilize the same communication path for passing messages as is used to communicate data between the controllers and the storage devices themselves. Storage devices such as RAID disc drive arrays may conventionally utilize Small Computer Systems Interface (SCSI) protocols over SCSI or Fibre Channel communication channel links. This is a reasonably effective message passing or communication scheme for controller-to-controller messaging when the number of messages is relatively small and the amount of data which is transmitted per message is a small percentage of the available finite communications channel bandwidth.

In one particular conventional RAID controller architecture and communication scheme, such as for example that utilized in certain families of RAID controllers made by Mylex Corporation (a subsidiary of International Business Machines), controller-to-controller messages are communicated through the same communication channels used to communicate data to and from the RAID arrays. These communication channels may include for example, PCI bus, backend disk storage device loops, fiber channel based device loops, or other structures for coupling host and/or storage systems to a storage system controller. While use of the PCI bus, backend disc loops, or other conventional means for such controller-to-controller messaging is not generally a problem or limitation when messages tend to be short, as the majority of such messages tend to be, there are however, problems and/or limitations that may arise where the message is relatively long. These relatively long messages may occur for example for write-back operations, such as Logical Unit (LUN) type I/O operations, where all of the host write data must be mirrored to the partner controller prior to status being returned to the host. As this must be accomplished prior to returning status to the host, it is imperative that it be accomplished as rapidly as possible. The inclusion of the mirrored host write data increases the size of the message as compared message types not containing appreciable data content. Conventionally, this data mirroring is accomplished using the PCI busses, backend disc loops, or the like channels.

In general, these prior art systems are problematic because use of such conventional interconnect schemes utilize finite channel bandwidth that may be better utilized for transferring data to and from the data storage system than for communicating messages between controllers. As a result performance bottlenecks result over the storage system communication channel and/or between respective controller related memory resources. Limitations associated with this disc-loop based scheme as well as with and other conventional controller-to-controller communication schemes may be expected to be more problematic as further demands are made on finite channel bandwidth limitations.

For example, a typical 66 MHz 64-bit PCI bus supports about 532 MB/second. This available bandwidth limits the number of Fibre Channels which can effectively be placed upon the bus without it saturating. Full duplex fiber channel protocol devices operating at 2 Gbit (about 400 MB/sec) may soon become available, and since they will be able to simultaneously send and receive data, their effective bandwidth will double, thereby further compounding the bandwidth limitation issues. Faster PCI busses (or other suitable interconnect bus schemes) may also someday become available, but are not available to meet present or near-term requirements.

Therefore, there exists a need for system, architecture, and method that increase channel available bandwidth and provides the desired device-to-device (or chip-to-chip or component-to-component) and memory access to reduce such performance bottlenecks. More particularly, there exists a need to provide structure, architecture, and method for improving controller-to-controller communication that does not degrade performance of host write I/O operations or other data transfer over the disk channels. There also remains a need for a modular building block architecture which can be used in a controller design to address the above described channel bandwidth and controller messaging limitations. There also remains a need for structure and method for a shared memory controller wherein one controller can directly access memory of its partner controller. There further remains a need for a flexible and expandable out-of-band controller-to-controller interconnection device and method which allows multiple controllers to be connected to provide the desired intercontroller communication while living within the limitations of the available bus architecture constraints, such as the available PCI bus bandwidth limitations. There also remains a need to provide larger sharable data cache memories within the controllers so as to increase the probability that a required data item will be available from a cache within a controller, thereby reducing the number of storage device accesses and the associated impact on system bandwidth.

SUMMARY

In one aspect, the invention provides a controller device for coupling data between a data storage system and a host computer. The controller includes a first primary processor and a first random access memory coupled to the first processor; a first auxiliary processor including a memory controller and a first cache memory coupled to the first memory controller, the first memory controller including a first interface for coupling with a second auxiliary processor including a second memory controller and an associated second cache memory and a second interface for coupling with the first auxiliary processor, the first memory controller including control logic for treating the first cache memory and a second cache memory associated with and coupled to the second memory controller as a single memory complex; at least one communications bus coupling the first primary processor and the first auxiliary processor; and an interconnection channel separate from the communications bus extending between and coupling the first interface of the first memory controller and the second interface of the second memory controller. In one embodiment, the interconnection channel is an out-of-band interconnect physical channel and protocol that permit device-to-device sharing their associated first and second cache memories without requiring data transfer over the first or second PCI busses. Method, computer program, and computer program product are also provided by the invention.

DETAILED DESCRIPTION OF EMBODIMENTS

As described above, a primary problem with using the known standard interconnect schemes, such as a PCI-based interconnect scheme, for a multiple Fibre Channel storage system controller is the limited bandwidth such interconnect and interconnection schemes provide, as well as the limited size of the available memory.

Figure 1:
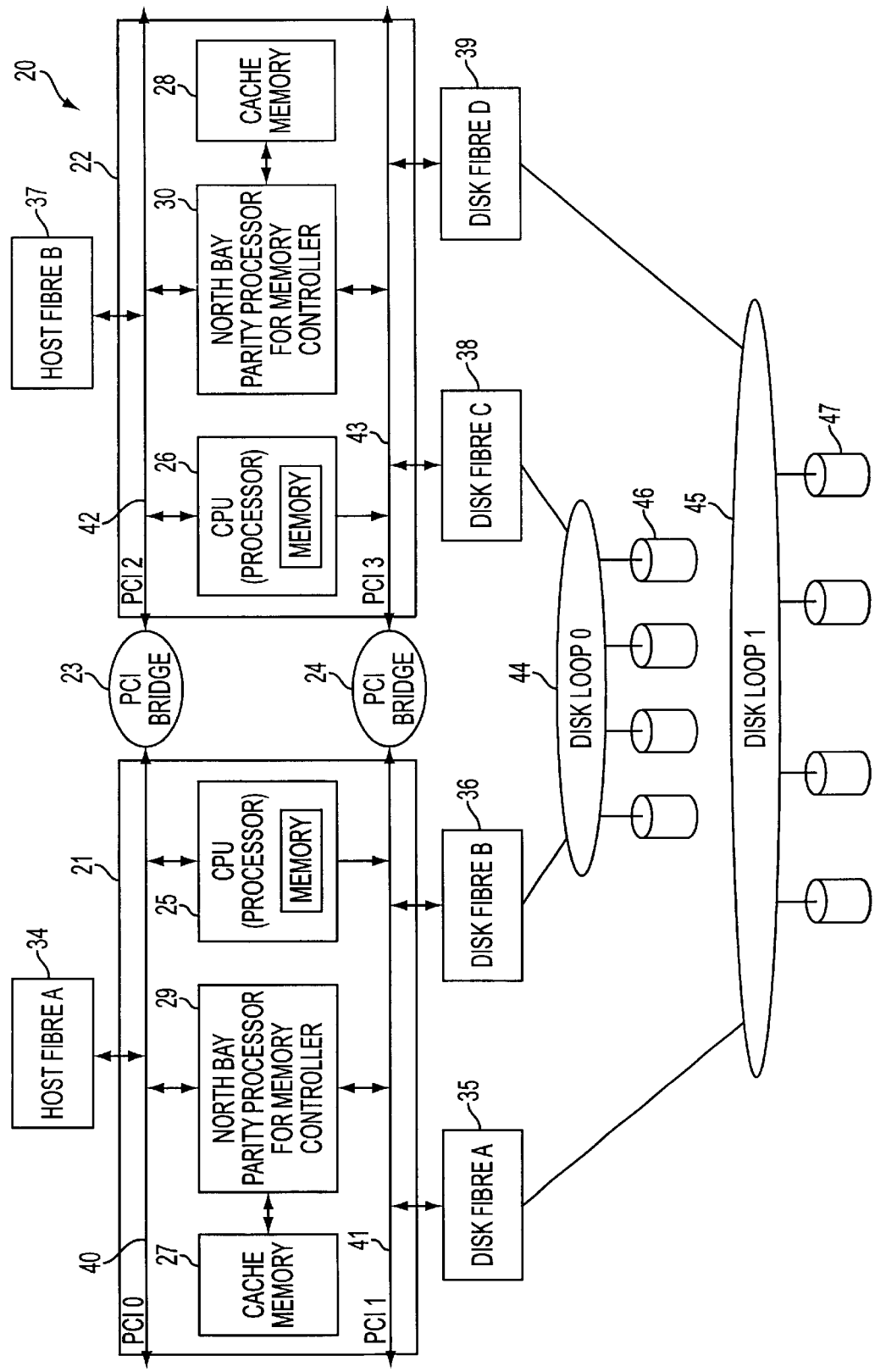
FIG. 1 is a diagrammatic illustration showing an embodiment of a controller configuration providing a specialized processor/memory controller (auxiliary processor) and its associated memory in addition to a CPU and shared disk loops.

One potential solution to these problems and limitations utilizes multiple controllers, each controller having a larger data memory cache. One such configuration is illustrated in FIG. 1 and utilizes a specialized processor/memory controller with its own cache memory in addition to the CPU or other general processor and associated memory. This specialized processor/memory controller may be referred to as the auxiliary processor, where the CPU is referred to as the primary processor. In one embodiment, the specialized processor/memory controller is the Mylex ASIC based NorthBay™ chip.

Embodiments of the NorthBay™ provides support services for a RAID controller. Among other things, the NorthBay ASIC implements a fast special-purpose-processor that computes the parity values used in the RAID system. The data for which the NorthBay ASIC is to handle memory operations and compute parity is specified by the RAID controller's CPU in response to host disk transactions.

The NorthBay also provides memory controller functionality, two PCI buses, and an exclusive-OR (XOR) engine for performing RAID 5 computations. It is known that such RAID 5 operations involve XORing multiple sources together to create a parity data destination. In the event of a data loss or corruption at one source, the parity data then can be XOR'd with all sources but one to regenerate the missing source. In one embodiment, the XOR engine is script based and is programmed to allow multiple different memory locations to be XOR'd together and stored in a separate locations. The memory controller component allows data to be brought in from either of the two PCI buses and stored in the NorthBay controller's associated memory. Data can also moved from the NorthBay associated memory over either of the two PCI buses. While these NorthBay features support system architecture and functionality, it should be understood that the invention is not limited to implementation only with the exemplary NorthBay processor/memory controller, but may be implemented in conjunction with other controller devices or CPUs supporting such structure, operation, and/or functionality.

Where special purpose processors, whether provided in the form of an ASIC or otherwise, are not provided, these parity and other computations may be handled in the controller CPU. Therefore, in describing the features of the present invention, references to a memory controller and parity computational processor within the storage device controller (e.g. RAID controller) should be interpreted to include CPU based systems and methods lacking special processors as well as systems and methods that provide separate processors, such as the Mylex controllers having the NorthBay ASIC. References throughout this description and drawings which refer to "NorthBay" are intended to mean the specific Mylex NorthBay chip as well as to variations and extensions thereof and further to any processor and/or memory controller whether provided by a single chip or circuit and whether provided by hardware, software, firmware, or a combination of these, that support the structural and functional characteristics needed in the invention. Such structural characteristics may, for example, be provided by generic processors incorporating these characteristics.

In one aspect, the embodiment of the system illustrated in FIG. 1 provides PCI bridges 23 and 24 that allow access to the memories 27 and 28 from either of host fiber 34 or host fiber 37. This provides the potential for treating the two memory complexes or pools as a single memory from the point of view of the host fiber interface 34, 37 or the disk fiber interface 35, 36, 38, 39. Therefore, in one aspect the invention provides a system which allows multiple memory pools to be viewed as a single entity through hardware support. (In the embodiment illustrated in FIG. 3, an out-of-band interconnect physical channel and protocol are provided that permit device-to-device sharing of the memories without requiring data transfer over the PCI busses.)

It will be appreciated that although only two controllers or devices are illustrated in the embodiments described herein, there may generally be any number of controllers or interconnected devices in the system of the invention.

In another aspect, the embodiment in FIG. 1 makes more PCI buses is available, which allows for greater aggregate bandwidth. Instead of simply having one host PCI bus and one disk interface bus to handle the system requirements, the configuration provides two host PCI busses PCI0 40 and PCI2 42 coupled by PCI bridge 23, and two disk interface busses PCI1 41 and PCI3 43 coupled by PCI bridge 24, to provide four busses. In alternative system configurations, additional controllers may be coupled together and their busses connected using additional bridges. Bus bridge circuits are known in the art and are not described in further detail here.

Increasing the size of data caches within each controller somewhat alleviates aspects of the PCI bandwidth issue, but it limits the number of independent disk loops available for storage. Recall, that fiber channel devices are connected in a loop topology. Packets of information travel around the loop in one direction and as they go past the devices, each device inspects them to determine if the information is intended for it. If not, it sends the package to the next device on the loop.

Without PCI Bridge 23 and PCI Bridge 24, disk loops 44 and 45 need to be connected to allow data from either memory 27 or memory 28 to be transferred to disk 46 on disk loop 44 or disk 47 on disk loop 45 (for example). Since multiple processor complexes 25, 26 share the same disk loop, the overall capabilities of the disk loop available to a processor complex is limited. A processor complex includes, for example, CPU 25 and its associated memory or CPU 26 and its associated memory.

It will be appreciated, that the PCI busses associated with communicating data to and from the disk fiber loops, that is PCI1 41 and PCI3 43 will generally have the largest bandwidth requirements due to RAID Level 5 write operations. For purpose of illustration, if it is assumed that there is a 7+1 RAID 5 volume, then for bandwidth-limited write operations, the ratio of the required bandwidth of a host PCI bus 40, 42 to a disk PCI bus 41, 43 is 7/8. So as between the host PCI bus and the disk PCI bus, the limiting factor is the disk PCI bus. Further assuming that the host wants to write data to disk drive on disk fiber A 35 through host fiber B 37, the write data must first be transferred into memory 28, then through PCI Bridge 24 or PCI bridge 23 into memory 27. Then from memory 27, it can be sent to disk fiber A 35. Thus the bandwidth requirements (ratio) is now 7/(7+7+1) or 7/15. Where there are seven host data copy from memory 28 to memory 27, seven write operations of data to disk, and one write operation of parity to disk. This requirements ration pertains to all data transfer taking place on the disk PCI buses PCI1 and PCI3.

In this system configuration 20, a first and second PCI-bus based controllers 21, 22 are coupled for communication by PCI bridges 23, 24. These PCI bridges 23, 24, though illustrated as being separate from the controllers for purposes of clarity, may in fact be included within each of the controllers 21, 22. For example, each controller may provide two PCI bridge circuits for coupling with two other controllers as needed. Each controller 21, 22 includes a CPU 25, 26 and memory 27,28. Where a separate processor or other circuit is provided for processing RAID parity data and/or for memory control, such as in the afore-described NorthBay ASIC processor, then the controllers 21, 22 also provide such additional processors 29, 30. Memory 27, 28 couple directly to their respective special processor 29, 30 when provided, or to CPU 25, 26 when not provided. When such additional processor are not provided, then the parity processing and/or memory control functions are retained by the controller CPU 25, 26. CPU 25 and optional special processor 29 are coupled to first PCI bus (PCI 0) 40 and second PCI bus (PCI 1) 41, and CPU 26 and optional special processor 30 are coupled to third PCI bus (PCI 2) 42 and fourth PCI bus (PCI 3) 43.

Each controller 21,22 further includes interfaces for interfacing between the host computers 31, 32 and the storage systems or devices 33. In the system configuration illustrated in FIG. 1, first controller 21 provides a Fiber Channel interface 34 for coupling to a first host (Host Fiber A) and first and second disk fibre channel interfaces (Disk Fiber A and Disk Fiber B) 35, 36 for coupling respectively to first disk loop 44 and second disk loop 45, each comprising at least one (and typically) a plurality of disk storage devices 46, 47. Second controller 22 analogously provides a Fiber Channel interface 37 for coupling to a first host (Host Fiber B) and first and second disk fibre channel interfaces (Disk Fiber C and Disk Fiber D) 38, 39 for coupling respectively to first disk loop 44 and second disk loop 45. Note that the disk drives or other storage devices or subsystems 46,47 are shared by and accessible to both Host A and Host B, as well as to any other host computers that may be coupled in the manner described.

While providing and connecting multiple controllers in this manner, particularly when the amount of cache memory in each of the controllers is increased, addresses some of the bandwidth limitation issues, it unfortunately limits the number of independent disk loops available for storage.

Figure 2:
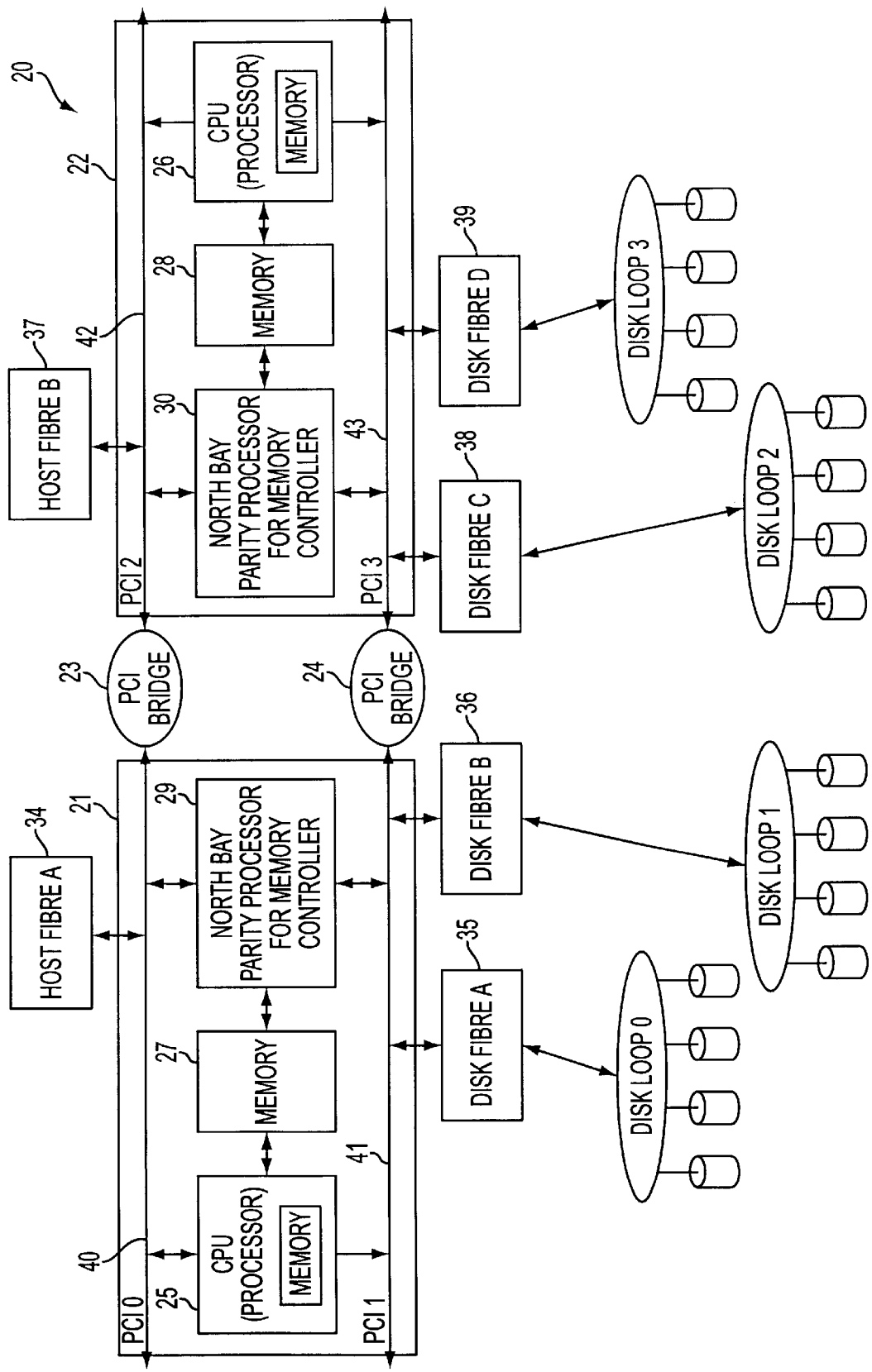
FIG. 2 is a diagrammatic illustration showing an embodiment of a controller configuration providing multiple specialized processor/memory controllers and their associated memories in addition to a CPU and multiple independent disk loops.

One possible solution to the problem of the number of independent disk loops is to actually use the four separate disk loops as illustrated in the configuration of FIG. 2, one from each disk fiber channel interface 35, 36, 38, 39, but pass data through one of the PCI bridges 23, 24. In this configuration, the number of independent disk loops are not so limited as in the configuration of FIG. 1 since a separate independent disk loop may be provided for each disk channel fibre interface 35, 36, 38, 39. Unfortunately, this potential solution is problematic as it faces bus bandwidth limitations on the PCI (or other) busses coupling the disk fiber channel interfaces (PCI PCI1 41 and PCI3 43) with the CPU 25, 26, optional specialized processor 29, 30, and memory 27, 28. In addition, should one of the Fibre Chips fail, the loop of drives associated with that chip will be lost.

Figure 3:
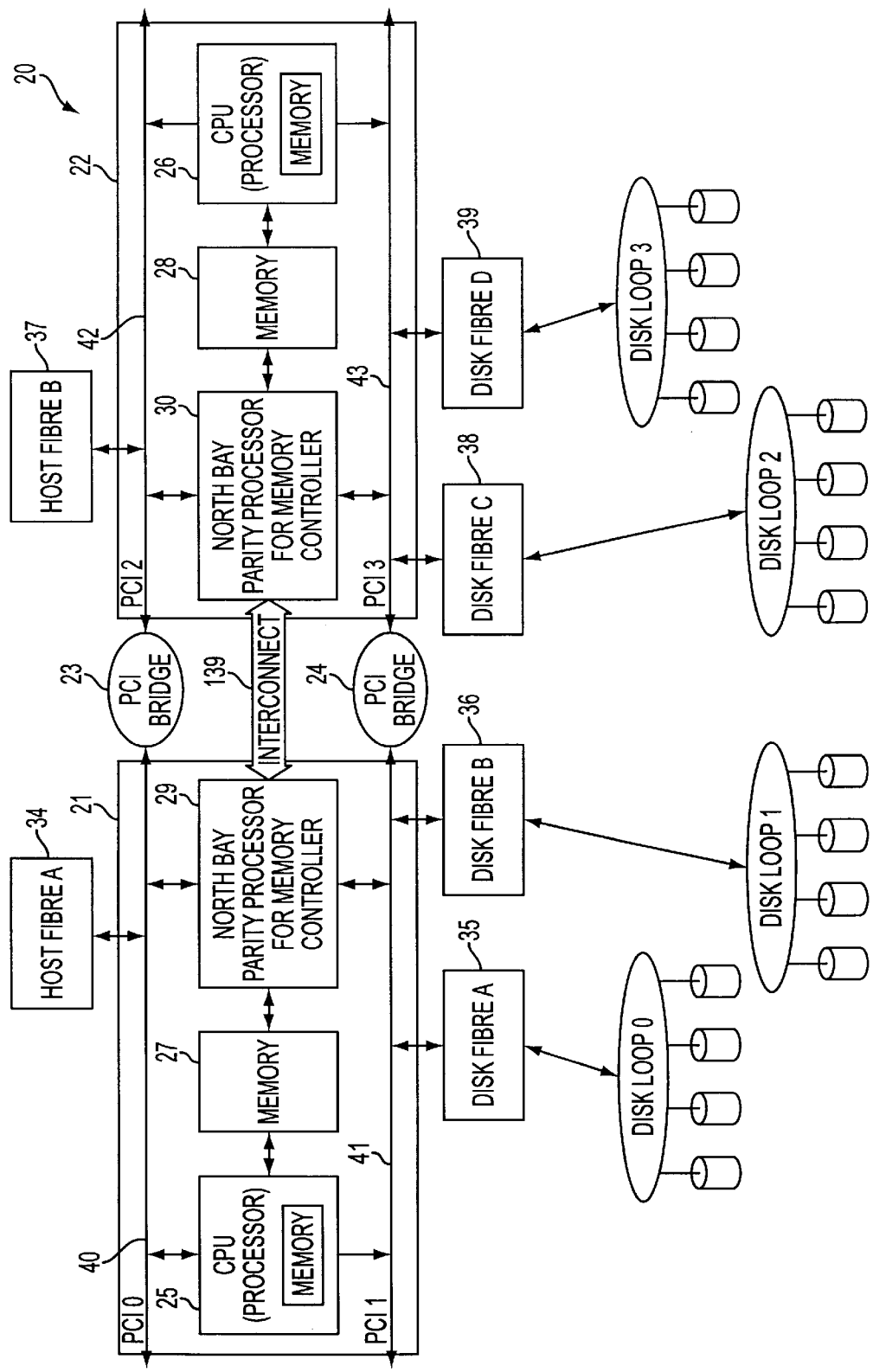
FIG. 3 is a diagrammatic illustration showing an embodiment of a controller configuration providing multiple interconnected specialized processor/memory controller and their associated memories in addition to a CPU and multiple independent disk loops.

A better solution, one that addresses the independent disk loop availability concern as well as the bus bandwidth limitations provides an out-of-band interconnect between controllers 21, 22 which can pass data back and forth while not interfering with the PCI busses, and overcoming the limitations of a single PCI bus. In the general case, each controller 21, 22 includes a CPU or other processor coupled to memory and the out-of-band interconnect connects a plurality of the CPUs or other processors so that they may pass data back and forth while not interfering with traffic on the PCI busses. In a preferred embodiment, the controllers each include a the NorthBay or other specialized processor/memory controllers which can pass data back and forth while not interfering with the PCI busses. This architecture providing an out-of-band local interconnect 139 is illustrated in the embodiment of FIG. 3.

The primary operating scenario under which data would be transferred between controllers 21, 22 (or more particularly between special processor/memory controllers 29, 30) is during RAID Level 5 XOR parity operations. A further operating scenario involves load balancing and utilizes the out-of-band interconnect 139 in conjunction with processing a host request, where the host request can come from one processor complex and the data be stored in another processor complex.

In one embodiment, other data transfers from one or more host computers or from reading data in for a XOR operation may take place over the PCI Bridges 23, 24. Involvement of the PCI bridges are now described in the context of an RAID 5 XOR command. First, a host write command is sent to host fiber A 34. Prior dirty write data for some RAID stripe is sitting in memory 28. Because part of the data required to perform the XOR is sitting in memory 28, there is a need either to transfer that XOR related data into memory 27 so that it is in the processor complex associated with Host Fibre A, or move the write data from the host fiber A 34 into memory 28. In either case, the XOR related data and the write data will be in the same location. For purposes of this description, it is assumed that the data from fibre host A 34 is moved to memory 27. The data from memory 27 is moved to memory 28 over either PCI bridge 23, PCI bridge 24, or interconnect 139. Next, the XOR operation is performed in NorthBay processor 30, and the write data is directed to appropriate disk drives according to the RAID level 5 organization.

In a preferred embodiment, the path with the least utilization would be used as the transfer path based on some policy, rule, or criteria. For example, a decision as to the path may be made based on the number of outstanding operations and the amount of data queued up on each possible path. Policies that direct particular data transfer operation to take place either over the PCI bridges or over the interconnect may be established, such as through software or firmware executing in the controllers 21, 22. Since, in a many real world application most of the data transfers are read operations, this allows the local interconnect 139 to be a lower bandwidth than is required to service the Fibre channel interface chips 34, 37, 35, 36, 38, 39.

It is acknowledged that if the system is running any mode in which both processor complexes are fully utilized, there may be little direct benefit from the inventive interconnect 139. If, however, the controllers 21, 22 are running in a mode in which one host port may access data that is another processor's complex's memory, then rather than having to transfer the data over one or more of the PCI buses, the data may be directly read from the other NorthBay's memory out to the host port. This operation frees up the disk PCI bus so that it only needs to handle movement of the data from NorthBay memory to and from disk storage. Not having to move data between NorthBay memory saves one memory to memory transfer for performance reasons and reduces the bandwidth requirements on the PCI buses.

Having described certain high-level structural, functional, and operational features of embodiments of the inventive interconnect, attention is now directed to particular embodiments of the interconnect structure and method.

The precise nature of the data flow changes and the relative impact on reducing PCI bus bandwidth requirements depends to some extent upon the nature and character of the out-of-band interconnect. Physically, the interconnect can be any one of a number of channel types of connection schemes which allow data movement between multiple memories. In one embodiment, it is a separate PCI interconnect with the DMA engine separate from the PCI busses already present to support host fibre and disc fiber communication. In another alternative, the interconnect is provided as a separate fiber Channel connection between the two chips implementing the specialized processor/memory controller (NorthBay). In yet another alternative, the interconnect 139 is implemented as an Scalable Coherent Interface (SCI) or SCI-based interconnect. Other alternative embodiments, may utilize Infiniband, Ethernet, Universal Serial Bus, Fire Wire, or any other physical connection and communication protocol that support the required connectivity and messaging.

When the interconnect 139 permits one NorthBay controller to directly access the other NorthBay controller's memory, such as may be provided with an SCI-based channel and protocol that permit memory sharing and maintain cache coherency. SCI based protocols are known in the art and not described in further detail here. With this direct type of interconnect, host fiber A 34 transfers its data directly into memory 27 associated with NorthBay 29. NorthBay 30 directly reads the data from North Bay 29 memory 27 to perform the XOR operation. The host data is then written to disk from memory 27, and the parity data (generated through the XOR operation in NorthBay 30) is written from memory 28.

In an alternative embodiment, in which the out-of-band interconnect 139 can simply perform data transfers, the data flow would be somewhat similar to that described above relative to data transfers from memory to memory through the PCI busses, with one exception. Instead of transferring the data from memory 27 to memory 28 over either of PCI bridges 23 or 24, the data is transferred through the out-of-band interconnect between NorthBay 29 and 30. In either scenario, the lower PCI bandwidth requirements are due to being able to move data from memory 27 to memory 28 without needing to go across the PCI bus or over the PCI bridges.

In one preferred embodiment, a point-to-point configuration provides two local interconnects 139-1, 139-2 on each specialized processor/memory controller 29, 30 chip. In a second preferred embodiment, a multi-drop configuration provides a single interconnect 139 on each specialized processor/memory controller chip. In PC board based controller implementations, this allows the specialized processor/memory controller chips to be daisy chained to allow the addition of additional cache memory capacity and XOR parity computational capacity as the controller performance requires. Note that the provision of either or both of greater XOR computational capacity or larger cache memory size enables the controllers to operate at higher and longer sustained burst rates. It also provides for more modular design in some implementations.

A modular system is one in which similar building blocks can be put together to create a more powerful system. For example, the processor complex having a processing unit and an associated memory form a module, which may be combined into systems (See, for example, FIG. 3) having multiple modular processor complexes to easily create more powerful system than would be provided using a single processor complex.

A multidrop interconnect or switch based interconnect allows multiple devices to be attached to the same data transfer channel. For multi-drop or switch based interconnect implementations, further improvements to system performance, including improvements to per processor/memory controller bandwidth availability and bus performance, may be achieved by adding additional specialized processor/memory controllers, memory, and fiber channel interface modules as a set. Using a serial type interface of which many types are known in the art facilities this modular daisy chaining approach.

It is noted that the available bandwidth is reduced for each respective NorthBay in a multidrop or switch based interconnect environment in proportion to the number of devices attached to the interconnect. Therefore if the total bandwidth available is B, and the number of devices attached is N, the bandwidth the available to each device is B/N (assuming an even distribution of workload).

This invention provides two architectural topologies and the communication methodology that may be used to communicate within and between devices, whether devices are on a common substrate or PC card or on different substrates or PC cards. In one aspect, the invention provides a building block which can be used in a controller design to address the messaging and channel bandwidth capacity limitations of conventional systems and methods. Depending upon the particular interconnect used, the inventive structure and method may also or alternatively be used to implement a shared memory controller design. This means that one controller can directly access memory of its partner controller in a dual-controller configuration.

With reference to the afore-described conventional architectures lacking a direct out-of-band interconnect, the communication of data, control, messages, or other information between two or more controllers, or in the more general case between two or more (controller or non-controller) devices, must necessarily take place through the backend disk loops, such as over the disk loop 118 via interfaces 114-A, 114-B and communication busses 117-A, 117-B, when no bus bridges are provided, or over one or the other of first and second PCI bridges 138, 140 when they are. Note that when the interconnect 139 is provided, the PCI bridges are optional though desirably provided.

Two primary alternative architectures that utilize embodiments of the inventive interconnect structure and method are now described. One is referred to as a point-to-point topology in which interconnect 139 is used as a communication path between each of two controllers or between each of two devices within a controller, for example between two NorthBay chips. The other is referred to as a multi-point or multi-drop topology and is used to interconnect a plurality of devices to the same data transfer or messaging channel. Even within the point-to-point topology, the interconnect may be between multiple NorthBay or other specialized processor/memory controller devices forming a single storage device controller located on a single PC board or other substrate or enclosure, or the interconnect may extend between two or more different storage device controllers. Furthermore, although embodiments of the invention are described relative to storage devices and storage deice controllers, cache memory, XOR computations, and the like, it will be understood that the structures and method described herein may be applied to various systems and devices wherein preserving available bandwidth and enlarging a pool of accessible memory is advantageous.

Figure 4:
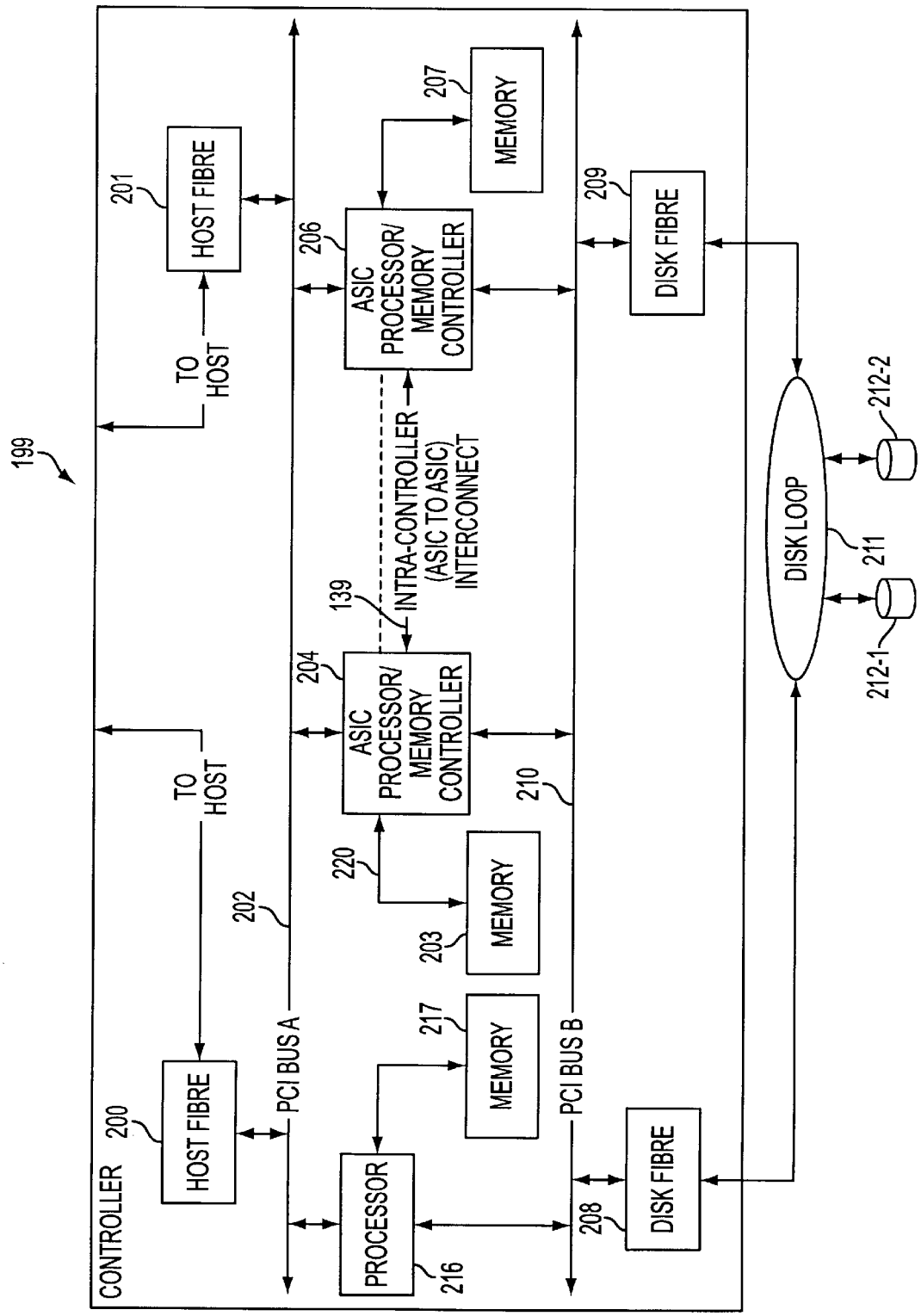
FIG. 4 is a diagrammatic illustration showing an embodiment of a single controller having multiple ASIC based specialized processor/memory controller logic and providing an interconnect for intra-controller communication.

With respect to the single-controller embodiment illustrated in FIG. 4, system architecture and device and connection topology 199 permits a single device such as a controller to support a greater total memory per device, for example memories 203 and 207 or, where the controllers or other devices are implemented as a printed circuit board or card (PC board or card), per controller card. The memories may be physically distinct, adjacent, or a common memory subject to control by different controllers, though in most embodiments, the memories are located on different controller cards. The interconnect 205 allows data to be easily transferred between memories 203, 207 associated with NorthBay ASIC implementing the specialized processor/memory controller 204, 206 without interfering with data or consuming bandwidth the PCI buss or busses (or other controller system bus) 202, 210 or Fibre Disk channel disk loop 211.

The inventive structure and method are applicable to a variety of devices and device controllers, but particularly applicable for storage device or storage system controllers, such as for example, RAID storage system or device controllers. For purposes of illustration but not limitation, the improvement in memory bandwidth between two or more memories 203, 207 and their associated NorthBay 204, 206 are described relative to the embodiment of a controller in FIG. 4. The illustration of FIG. 4 focuses on the NorthBay and its associated memory 217 which are constituent elements of a device, such as a storage controller device, and does not show the components of the controller processor 216 so as to avoid obscuring the invention. Note that as in this embodiment these elements are part of a single device, such as a single controller device, no PCI bus bridges are required as are provided in the other embodiments of the invention described hereinafter. Furthermore, the inventive structure and method remove the need for the PCI bridges, thus freeing up the PCI busses to work on I/O traffic. The interconnect is then used for controller to controller messages.

Figure 5:
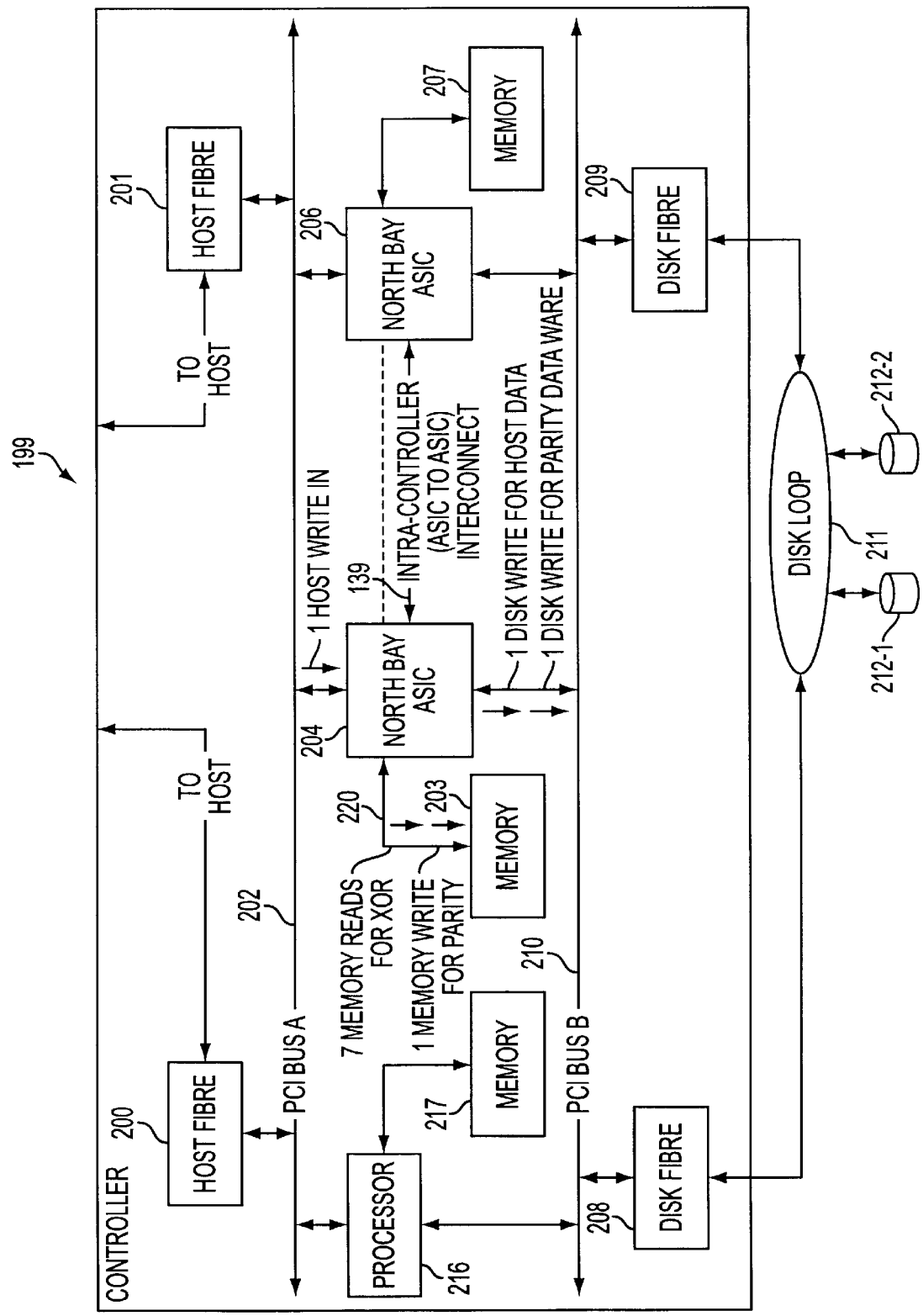
FIG. 5 is a diagrammatic illustration showing an embodiment of the controller in FIG. 4 and indicating certain read and write operations for purposes of comparison with FIG. 6.
Figure 6:
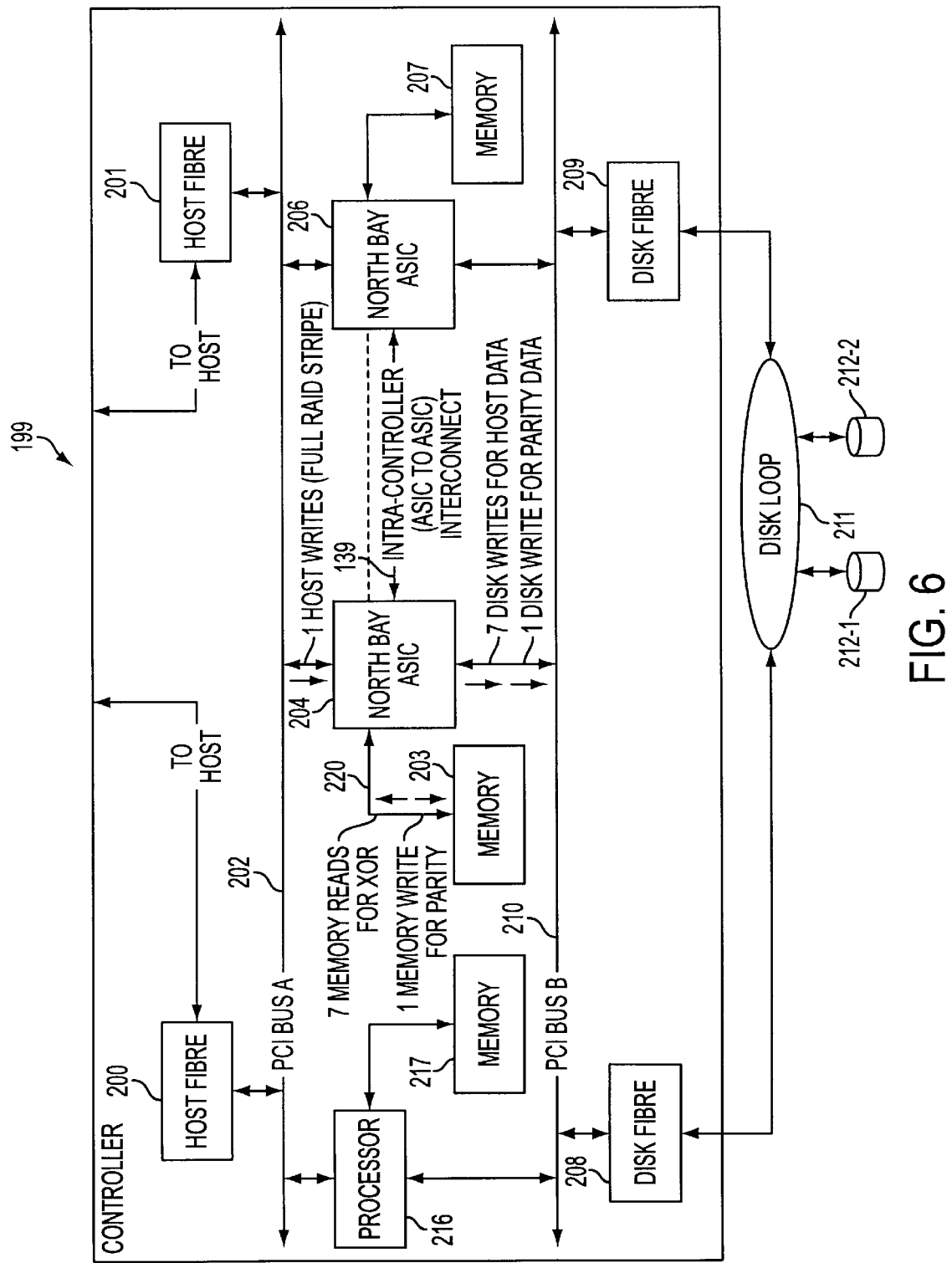
FIG. 6 is a diagrammatic illustration showing an embodiment of the controller in FIG. 4 and indicating different read and write operations for purposes of comparison with FIG. 5.

Two exemplary operating scenarios, a postulated worst case memory utilization scenario (See FIG. 5) and a most balanced case for PCI bus loading versus memory utilization scenario (See FIG. 6) are now analyzed and described relative to the architecture in FIG. 4 so that the benefits of aspects of the invention may be more concretely illustrated. For purposes of illustration, an exemplary eight-disk drive, RAID Level 5 (RAID 5) configuration where a 1-stripe write is assumed, and all other information used to perform the XOR operation is assumed to be in memory. This scenario provides what might be considered a worst case or near worst case memory utilization scenario. A host write operation to controller NorthBay 204 involves seven memory read operations (read) from memory 203 for XOR data and one memory write operator (write) to memory 203 for parity. There is also one disk write operation from the controller NorthBay 204 to Fibre Disk 208 via PCI (or other) bus 210 for host data over PCI (or other) bus 202, and one disk write operation for parity data. Assuming for purposes of illustration that each PCI bus 202, 210 is capable of sustaining a 512 MB/sec data transfer, the interface 220 between the controller NorthBay 204 and its associated memory 203 has been empirically determined to sustain about 1.066 GB/sec under the memory utilization scenario.

When assuming seven host write operations (for example, for a full RAID stripe) over PCI bus 202 (PCI bus A) rather than a one stripe write as in the previous example, seven disk writes to the PCI bus 210 (PCI bus B) occur for the host data (rather than one disk write for the previous example). A single disk write for parity data occurs as before.

Calculation of PCI (or other bus) utilization duly considers that the total PCI bus 202 capacity including PCI bus 202 (PCI Bus A) and PCI bus 210 (PCI Bus B) are 1.066 GB/sec and that they will perform 8N writes (for XOR memory transfers), plus 8N writes (for Disk Write transfers), plus 7N writes (for Host Data transfers), so that solving for N, it is determined that N=46 MB/sec. Therefore, in this scenario representing a hypothetical balanced case for PCI bus loading versus memory utilization, the PCI bus 202 will have a maximum utilization of 7N=322 MB/sec, and the PCI bus 210 will have a maximum utilization of 8N=368 MB/sec. For this reason using multiple controller NorthBay 204, 206 sufficient memory bandwidth can be provided from memories 203, 207 to fully utilize the PCI buses 202, 210 each of which can support a 512 MB/sec transfer rate.

Recall that in many conventional RAID controller architectures, all controller-to-controller messages are communicated through the backend disk loops. In general, this is not a problem since the majority of messages, in term of message count, tend to be short. However, for write-back logical unit (write-back LUN) operations, all of the host write-back data must be mirrored or copied to the partner controller prior to the status being returned to the host, and the impact of the backend loop controller-to-controller communications, especially in terms of the volume or length of these messages, can be significant. This exemplary architecture also provides an additional disk loop structure subsystem and Fibre Disk Channel interface within each controller.

Figure 7:
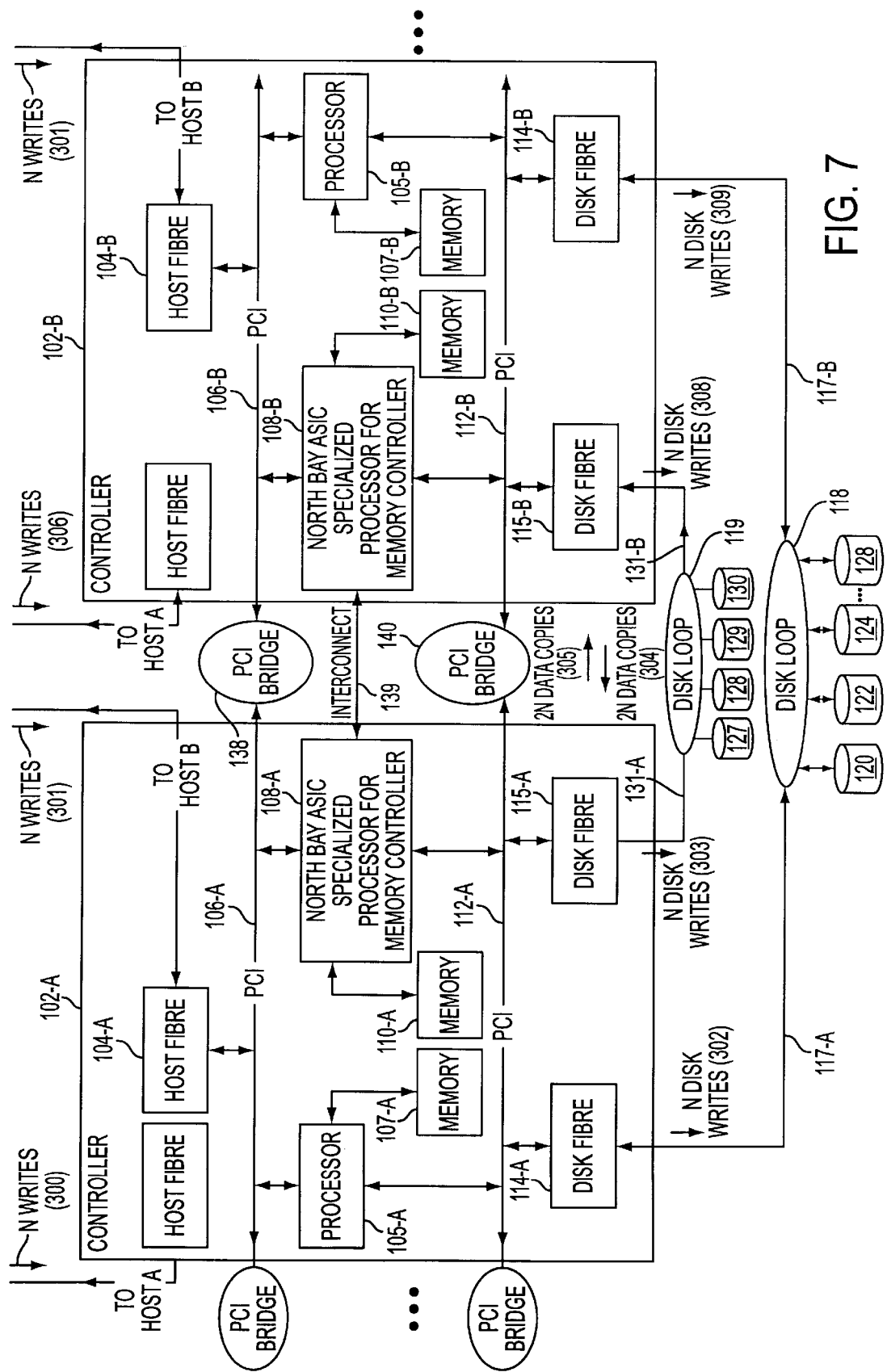
FIG. 7 is a diagrammatic illustration showing an embodiment of a two controllers each having at least one specialized processor/memory controller logic and providing an interconnect for inter-controller communication.

In the two-controller configuration of FIG. 7, there are shown each of two controllers, controller A 102-A and controller B 102-B. While in general each controller may have different internal structure, they typically will have the same or similar internal controller structure and therefore controller A and controller B are shown as being the same. The structure of only one controller is described, the structure of the second controller being the same. Each controller 102 includes a processor 105 coupled to a memory 107. Controllers of this type may be implemented as an NorthBay or one or more NorthBay may contribute toward formation of a card based controller. The processor 105 is coupled to other components of the controller 102 by one or more controller system busses, such as for example by first and second PCI busses, PCI 106 and PCI 112. An NorthBay 108, when forming part of the controller, with its associated memory 110 is also coupled to the or each system bus PCI 106 and PCI 112. One or more Fibre Channel host interfaces 104 couple the host computer system (not shown) to the processor 105, and NorthBay 108, as well as to the storage devices (e.g. hard disk drives) 120–126 via Fibre Channel Disk interfaces 114 and backend disk channel and loop 117,118. These disk loop channels also extend between each of the two controllers 102-A, 102-B enabling both controllers and the respective host or hosts coupled to them to access the storage devices.

In the embodiments of the inventive structure and method, an interconnecting communication channel 139, separate from the disk loop channels 117, 118, controller system busses 106, 112, bridges 138, 140, and host busses, couples the NorthBay 204, 206 within a single controller (See FIG. 4) or ASICs within multiple controllers 102-A, 102-B for communication via there respective NorthBay 108A, 108B. This type of channel is not provided for this purpose in conventional systems, architecture or methods.

For a conventional system configuration in which no NorthBay interconnection 139 is provided, and in which the backend disk loops are implemented with Fibre Channel 117, 118; the limitations associated with Fibre Channel characteristics such as bandwidth and other characteristics may be evaluated. An exemplary configuration of two controllers (Controller "A" 102A and Controller "B" 102B) is illustrated in FIG. 7. Several observations are may be made relative to this controller configuration and its operation. Controller "A" receives N write operation commands from host; and performs N disk write operations to one or more disk drives 120–126, where N may be any integer number).

In analogous manner, controller "B" receives M write operation commands from the same or a different host; and performs M disk write operations to one or more disk drives 120–126. While M and N will in general be different for any particular period of time, for purposes of simplified description we assume M=N. This simplifies the analysis and does not alter the generality of the result. For this scenario, there are 2N data copies that are communicated from Controller "A" to Controller "B" over backend disk loop channel 131, 117 and 2N data copies that are communicated from Controller "B" to Controller "A" over backend disk loop channel 117, 131. In other words, if one assumes that the data copies are distributed amongst the disk channels, one may observe that N writes on a Fibre host channel generates 4N total data transfers on a backend disk channel. This calculation does not account for the parity data writes (in addition to the data writes) that would increase the number of data transfers on the backend disk channels for example, a RAID Level 5 type system. Thus for a 100 MB/sec Fiber Channel interface and a conventional system not providing the interconnection 139, the greatest host write capacity or rate that can be sustained absent the inventive interconnect is one-quarter of the 100 MB/sec maximum capacity, or N=25 MB/sec.

By comparison, when the inventive inter-connection communication channel 139 is provided as illustrated in architecture B of FIG. 7, the host interfaces are better utilized. For example, if the interconnect 139 is implemented as a 64-bit wide PCI bus running at 66 MHZ, for example, it will support transfer at 512 MB/sec across it. This means that the 4N data copies which originally needed to be sent across the disc fiber loops 117, 131 can now be sent across the controller-to-controller (inter-controller NorthBay-to-NorthBay) interconnect 139. Removal of the conventional requirement to support 4N data copy operations over the disk fibre loops 117, 118, 113, 119 allows all of the loops 117, 131, 118, 119 to be run at full bandwidth, for example at 100 MB/sec rather than at 25 MB/sec (a gain of about 4 times) for the exemplary Fibre Channel embodiment.

Figure 8:
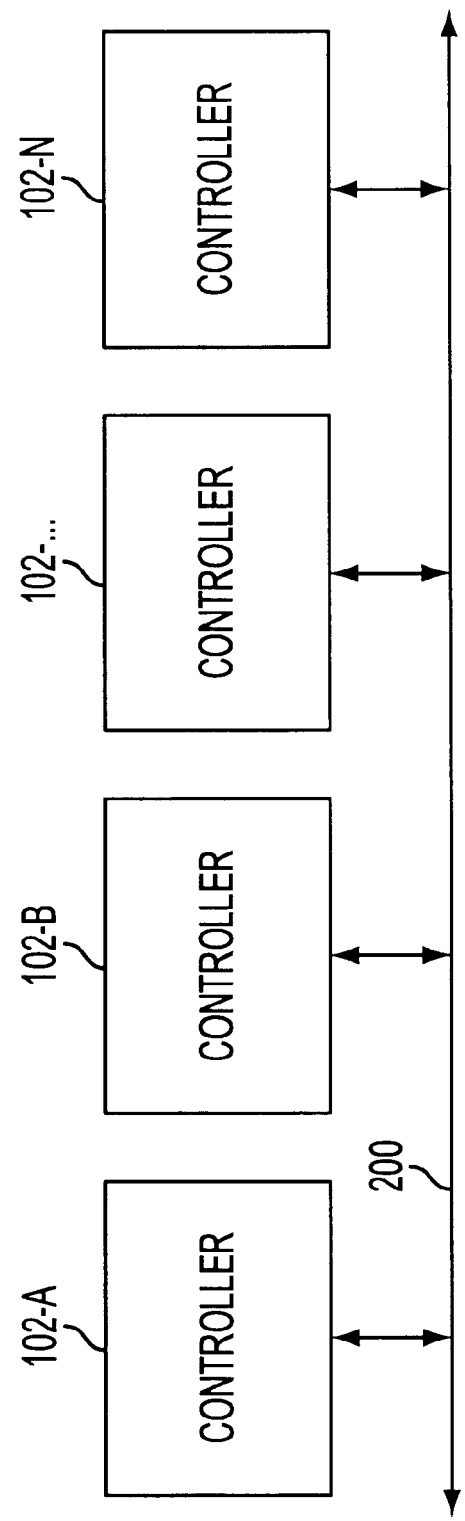
FIG. 8 is a diagrammatic illustration showing an embodiment of a multi-drop configuration wherein each of a plurality of controllers communicate over a single interconnect.

It will be appreciated that the afore-described multiple-controller architecture of FIG. 7 provided inter-controller communication, that is communication between two separate controllers using ASICs or other circuitry in each controller. Frequently, the two controllers will be implemented as separate boxes or PC cards so that this architecture may alternatively be considered as an inter-card communication scheme providing multi-drop capabilities. A multi-drop architecture providing a plurality of controllers 102-A, . . . , 102-N communicating with a single shared interconnect 200 is illustrated in FIG. 8. Of course any plurality of controllers may be used so that the invention is not limited to systems or methods having only two controllers. Therefore, although the invention has been described in terms of embodiments having two controllers, for example partner controllers in a dual-active configuration, it will be appreciated that the invention may be extended to additional controllers in analogous manner.

The invention provides method and when implemented in software, firmware, or a combination of software and firmware, or software, firmware, and hardware, the invention further provides a computer program and computer program product.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A controller device for coupling data between a data storage system including a plurality of disk arrays and a host computer, said controller device comprising:

a first prima processor and a first random access memory coupled to said first primary processor;

a first auxiliary processor including a first memory controller and a first memory coupled to said first memory controller, said first memory controller including a first interface for coupling with a second auxiliary processor including a second memory controller and an associated second memory and a second interface for coupling with said first auxiliary processor, said first memory controller including control logic for treating said first memory and said second memory as a single memory complex;

at least one communications bus for communication with the plurality of disk arrays coupling said first primary process and said first auxiliary processor; and an interconnection channel separate from said communications bus extending between and coupling said first interface of said first memory controller and said second interface of said second memory controller.

2. The controller device in claim 1, wherein said first auxiliary processor further comprises an exclusive-OR engine.

3. The controller device in claim 2, wherein said exclusive-OR engine executes instructions performing RAID Level 5 parity calculations.

4. The controller device in claim 1, wherein said at least one communications bus comprises at least on PCI bus.

5. The controller device in claim 1, wherein said at least one communications bus comprises first and second PCI buses, said primary processor and said auxiliary processor each being coupled to each of said first and said second PCI busses.

6. The controller device in claim 5, wherein said interconnection channel comprises an out-of-band interconnect physical channel and protocol that permit device-to-device sharing their associated first and second memories without requiring data transfer over the first or second PCI busses.

7. The controller device in claim 6, wherein said interconnection physical channel is selected from the set of physical channels consisting of a serial channel, an SCI channel, a fire wire channel, a SCSI channel, an Ethernet channel, a Fibre channel, Infiniband Connection, and combinations thereof.

8. The controller device in claim 2, wherein said XOR engine comprises a programmable script-based engine allowing multiple different memory locations to be XOR'd together and the results of the XOR operation to be stored in separate memories.

9. The controller device in claim 5, wherein said first memory controller allows data to be brought in from either of the two PCI buses and stored in the first memory associated with said first memory controller.

10. The controller device in claim 1, wherein said first memory controller has primary responsibility for a write operation and said second memory controller is a partner controller to said first memory controller, and wherein host write data is mirrored to said partner controller over said interconnection in connection with a write back I/O operation for said first memory controller.

11. The controller device in claim 1, wherein said primary processor, and said first and second auxiliary processors are disposed on a common substrate.

12. The controller device in claim 11, wherein said common substrate comprises a PC board.

13. The controller device in claim 1, wherein said primary processor and said first auxiliary processor are disposed on a first common substrate, and said second auxiliary processor is an external auxiliary processor disposed on a second substrate different from said first substrate.

14. The controller device in claim 1, wherein said first and said second memory operate as first and second cache memories.

15. A controller device for coupling data between a data storage system including a plurality of disk arrays and a host computer, said controller device comprising:

a first prima processor and a first random access memory coupled to said first processor;

a first auxiliary processor including a memory controller and an XOR processing engine executing instructions for RAID parity calculations, and a first cache memory coupled to said first memory controller, said first memory controller including a first interface for coupling with a second auxiliary processor including a second memory controller and an associated second cache memory and second interface for coupling with said first auxiliary processor, said first memory controller including control logic for treating said first cache memory and a second cache memory associated with and coupled to said second memory controller as a single memory complex;

at least one communications PCI bus for communication with the plurality of disk arrays coupling said first primary processor and said first auxiliary processor; and an interconnection channel separate from said communications bus extending between and coupling said first interface of said first memory controller and said second interface of said second memory controller, said interconnection channel comprising an out-of-band interconnect physical channel protocol that permit device-to-device sharing of their associated first and second cache memories without requiring data transfer over said PCI bus.

16. The controller device in claim 15, wherein said XOR engine comprises a programmable script-based engine allowing multiple different memory locations to be XOR'd together and the results of the XOR operation to be stored in separate memories.

17. The controller device in claim 16, wherein said first memory controller allows data to be brought in ver said PCI bus and stored in the first cache memory associated with said first memory controller.

18. The controller device in claim 15, wherein said first auxiliary controller is operative with a device controller has primary responsibility for a write operation and said second auxiliary controller is operative in a second controller device that is a partner controller device to said first controller device, and in connection with a write back I/O operation for said first device controller, host write data is mirrored to said partner controller over said interconnection.

19. In a computer system having a plurality of host computers, and a data storage system configured at east in part as a RAID and shared by said plurality of host computers and controlled by a plurality of controllers, each controller including at least one processor and a memory associated with and coupled to said processor, said processors being coupled by a system bus and by an interconnect different from said system bus, a method of performing a write operation to said storage system comprising:
- receiving a host write command including a host write data;
- identifying the memory or memories wherein are stored XOR operation data required to perform a RAID XOR operation including memories storing relevant prior write data for a RAID stripe;
- identifying a single memory from amongst all available memories to gather all of said XOR operation data;
- transferring all of said XOR operation data from memories other than said identified single memory to gather all of said XOR operation data in said identified memory over said direct interconnection different from said system bus;
- performing the XOR operation using said gathered XOR operation data; and directing the write data and the parity data from said XOR operation to the RAID storage system.

20. The method in claim 19, wherein said single memory is identified from amongst said memories already storing some XOR operation data.

21. In data storage system storing user data and parity data associated with said user data and controlled by a plurality of controllers, each of said controllers including at least one processor and an associated memory, said processors being coupled by a bus and by an interconnect different from said bus, a method of performing a write operation to said storage system comprising:
- receiving a write command;
- identifying memories wherein are stored parity operation data required to perform a parity operation in connection with performing said write command, said parity operation data including any relevant prior write data;
- identifying a memory from amongst said identified memories to gather all of said parity operation data;
- transferring all of said parity operation data to said identified memory over a direct interconnection different from a system bus;
- performing the parity operation using a single processor and its associated memory; and
- directing the write data and the parity data from said parity operation to the storage system.

22. The method in claim 21, wherein said write command includes write data.

23. The method in claim 21, wherein said parity operation data further includes any relevant prior write data.

24. A computer program product for use in conjunction with a computer system, the computer program product comprising a computer readable storage medium and a computer program mechanism embedded therein, the computer program mechanism, comprising:
- a program module that directs a computer system having a plurality of hosts, and a data storage system configured as RAID shared by said plurality of hosts and controlled by a plurality of controllers, to function in a specified manner, each controller including at least one processor and a memory associated with said processor, the program module including instructions for:
  - receiving a host write command including a host write data;
  - identifying the memory or memories wherein are stored all XOR operation data required to perform a RAID XOR operation, including any relevant prior write data for a RAID stripe;
  - identifying a single memory from amongst said identified memory or memories to gather all of said XOR operation data;
  - transferring all of said data from memories other than said identified single memory to said identified memory over a direct interconnection different from a system bus;
  - performing the XOR operation; and
  - directing the write data and the parity data from said XOR operation to the RAID storage.

25. A computer program product for use in conjunction with a data storage system, the computer program product comprising a computer readable storage medium and a computer program mechanism embedded therein, the computer program mechanism, comprising:
- a program module that directs a data storage system storing user data and parity data associated with said user data and controlled by a plurality of controllers each including at least one processor and an associated memory, and being coupled by a bus and by an interconnect different from said bus, to function in a specified manner, the program module including instructions for:
  - receiving a write command; identifying memories wherein are stored parity operation data required to perform a parity operation in connection with performing said write command, said parity operation data including any relevant prior write data;
  - identifying a memory from amongst said identified memories to gather all of said parity operation data;
  - transferring all of said parity operation data to said identified memory over a direct interconnection different from a system bus;
  - performing the parity operation using a single processor and its associated memory; and
  - directing the write data and the parity data from said parity operation to the storage system.

26. The computer program product in claim 25, wherein said write command includes write data.

27. The method in claim 25, wherein said parity operation data further includes any relevant prior write data.

28. An apparatus for communicating a message between first and second devices, each said first and second device having respective first and second processors, said apparatus comprising:
- a communication bus coupled to the first and second processors for communication with a plurality of disk array;
- a first memory controller separate from said first processor and a first memory coupled to and controlled by said first memory controller;
- a second memory controller separate from said second processor and a second memory coupled to and controlled by said second memory controller;
- a communications interconnect, separate from said communication bus, coupling said first and said second memory controllers for out-of-band communication between said first and second devices; and a communication path selector directing communication between said first and second devices to occur over either said communications bus or said communications interconnect according to predetermined selection rules.

29. The apparatus in claim 28, wherein said devices comprise at least two storage device controllers.

30. The apparatus in claim 29, wherein said message comprises controller configuration information.

31. The apparatus in claim 29, wherein said message comprises cache information.

32. The apparatus in claim 29 wherein said message comprises information facilitating maintaining coherency between caches within said controllers.

33. The apparatus in claim 28, wherein said communication path selector comprises a path selector procedure implemented as a computer program having instructions executing within at least one of said first and second devices.

34. The apparatus in claim 33, wherein said computer program executes within at least one of said first and second processors.

35. An apparatus for communicating a message between first and second devices, each said first and second device having respective first and second processors coupled for in-band communication by a communication bus, said apparatus comprising:

a first memory controller separate from said first processor and a first memory coupled to and controlled by said first memory controller;

a second memory controller separate from said second processor and a second memory coupled to and controlled by said second memory controller;

a communication interconnect, separate from said communication bus, coupling said first and said second memory controllers for out-of-band communication between said first and second devices;

a communication path selector directing communication between said first and second devices to occur over either said communications bus or said communications interconnect according to predetermined selection rules, and wherein said computer program executes within at tleast one of said first and second memory controllers.

36. An apparatus for communicating a message between first and second devices, each said first and second device having respective first and second processors coupled for in-band communication by a communication bus, said apparatus comprising;

a first memory controller separate from said first processor and a first memory coupled to and controlled by said firs memory controller;

a second memory controller separate from said second processor and a second memory coupled to and controlled by said second memory controller;

a communications interconnect, separate from said communication bus, coupling said first and said second memory controllers for out-of-band communication between said first and second devices;

a communication path selector directing communication between said first and second devices to occur over either said communications bus or said communications interconnect according to predetermined selection rules, and wherein said communication path selector comprises a path selector procedure implemented as first and second computer programs having instructions executing within at least one of said first and second processors and within at least one of said first and second memory controllers.

37. The apparatus in claim 28, wherein:

said devices comprise at least two storage device controllers;

said message comprises information selected from the set consisting of controller configuration information, information facilitating maintaining coherency between caches within said controllers, and combinations thereof; and said communication path selector comprises a path selector procedure implemented as a computer program having instructions executing within at least one of said first and second devices.

38. The apparatus in claim 37, wherein said computer program executes within at least one of said first and second processors.

39. An apparatus for communicating a message, said message comprising information selected from the set consisting of controller configuration information, information facilitating maintaining coherency between caches within said controllers, and combinations thereof, between first and second devices, each said first and second device having respective first and second processors coupled for in-band communication by a communication bus, and each of said devices comprising at least two storage device controllers, said apparatus comprising:

a first memory controller separate from said first processor and a first memory coupled to and controlled by said first memory controller;

a second memory controller separate from said second processor and a second memory coupled to and controlled by said second memory controller;

a communications interconnect, separate from said communication bus, coupling said first and said second memory controllers for out-of-band communication between said first and second devices; and a communication path selector directing communication between said first and second devices to occur over either said communications bus or said communications interconnect according to predetermined selection rules, the communication path selector comprising a path selector procedure implemented as a computer program having instructions executing within at least one of said first and second devices, wherein said computer program executes within at least one of said first and second memory controllers.

40. An apparatus for communicating a message, said message comprising information selected from the set consisting of controller configuration information, information facilitating maintaining coherency between caches within said controllers, and combinations thereof, between first and second devices, each said first and second device having respective first and second processors coupled for in-band communication by a communication bus, and each of said devices comprising at least two storage device controllers, said apparatus comprising:

a first memory controller separate from said first processor and a first memory coupled to and controlled by said first memory controller;

a second memory controller separate from said second processor and a second memory coupled to and controlled by said second memory controller;

a communications interconnect, separate from said communication bus, coupling said first and said second memory controllers for out-of-band communication between said first and second devices; and a communication path selector directing communication between said first and second devices to occur over either said communications bus or said communications interconnect according to predetermined select ion rules; wherein said communication path selector comprises a path selector procedure implemented as first and second computer programs having instructions executing within at least one of said first and second processors and within at least one of said first and second memory controllers.

41. An apparatus for communicating a message between first and second storage device controllers, each said first and second storage device controllers having respective first and second processors, said apparatus comprising:

a PCI-based communication bus coupled to the first and second processors for communication with a plurality of disk array:

a first memory controller and first RAID parity operation processor separate from said first processor and a first cache memory coupled to and controlled by said first memory controller;

a second memory controller and second RAID parity operation processor separate from said second processor and a second cache memory coupled to and controlled by said second memory controller;

a communications interconnect, separate from said PCI-based communication bus, coupling said first and said second memory controllers and parity operation processors for out-of-band communication of said message between said first and second devices;

said message comprises information selected from the set consisting of controller configuration information, information facilitating maintaining coherency between caches within said controllers, an combinations thereof; and a communication path selector routing communication between said first and second devices to occur over either said communications bus or said communications interconnect according to predetermined selection rules, said selection rules including a load-leveling rule taking into account bus loading and interconnect loading and attempting to achieve a desired loading ratio.

42. The apparatus in claim 41, wherein said message comprises controller configuration information.

43. The apparatus in claim 41, wherein said message comprises cache information.

44. The apparatus in claim 41, wherein said message comprises information facilitating maintaining coherency between caches within said controllers.

45. The apparatus in claim 41, wherein said communication path selector comprises a path selector procedure implemented as a computer program having instructions executing within at least one of said first and second devices.

46. An apparatus for communicating a message between first and second RAID storage device controllers, each said first and second storage device controllers having respective first and second processors coupled for in-band communication by a PCI-based communication bus, said apparatus comprising:

a first memory controller and first RAID parity operation processor separate from said first processor and a first cache memory coupled to and controlled by said first memory controller;

a second memory controller and second RAID parity operation processor separate from said second processor and a second cache memory coupled to and controlled by said second memory controller;

a communications interconnect, separate from said PCI-based communication bus, coupling said first and said second memory controllers and parity operation processors for out-of-band communication of said message between said first and second devices;

said message comprises information selected from the set consisting of controller configuration information, information facilitating maintaining coherency between caches within said controllers, and combinations thereof; and a communication path selector routing communication between said first and second devices to occur over either said communications bus or said communications interconnect according to predetermined selection rules, said selection rules including a load-leveling rule taking into account bus loading and interconnect loading and attempting to achieve a desired loading ratio, wherein said desired loading ratio is about a 50%—50% loading ratio.

47. A system for communication between a first memory controller and a second memory controller, the system for use with a plurality of hosts and a plurality of disk arrays, the system comprising:

a first host bus coupled to the first memory controller and operable to communicate with a first host of the plurality of hosts;

a first disk bus coupled to the first memory controller and operable to communicate with at least a first disk array of the plurality of disk arrays;

a second host bus coupled to the second memory controller and operable to communicate with a second host of the plurality of hosts;

a second disk bus coupled to the second memory controller and operable to communicate with at least a second disk array of the plurality of disk arrays;

a first interconnect coupling said first disk bus and said second disk bus; and an out-of-band interconnect, separate from said first interconnect, coupled between said first and second memory controllers.

48. A system according to claim 47, further comprising a second interconnect, separate from said out-of-band interconnect, coupling said first host bus and said second host bus.

49. A system according to claim 47, wherein the first interconnect comprises a PCI bridge.

50. A system according to claim 47, wherein the out-of-band interconnect comprises an interconnect selected from the group of interconnects consisting of a serial channel, an SCI channel, a fire wire channel, a SCSI channel, an Ethernet channel, a Fibre channel, and an Infiniband Connection.

51. A system according to claim 47, wherein the first and second disk buses are each operable to communicate with a first and second plurality of disk arrays.

* * * * *